United States Patent

Kamimaki et al.

[11] Patent Number: 5,812,859
[45] Date of Patent: Sep. 22, 1998

[54] INFORMATION PROCESSING APPARATUS WITH WORK SUSPEND/RESUME FUNCTION

[75] Inventors: Hideki Kamimaki, Yokohama; Koichi Isaji, Nagoya; Masatomi Sasaki, Owariasahi; Koichi Kimura; Takayuki Tamura, both of Yokohama; Tsuguji Tachiuchi, Odawara, all of Japan

[73] Assignee: Hitachi, Ltd., Tokyo, Japan

[21] Appl. No.: 835,511

[22] Filed: Apr. 8, 1997

Related U.S. Application Data

[63] Continuation of Ser. No. 405,093, Mar. 16, 1995, abandoned.

[30] Foreign Application Priority Data

Mar. 18, 1994 [JP] Japan .................................. 6-048902

[51] Int. Cl.⁶ ............................................................ G06F 1/30
[52] U.S. Cl. ................................................................ 395/750.01
[58] Field of Search ........................... 395/750.01, 750.02, 395/282, 283, 182.22, 182.01, 733; 711/115; 364/707; 365/228, 229

[56] References Cited

U.S. PATENT DOCUMENTS

| 3,801,963 | 4/1974 | Chen | 340/172.5 |
|---|---|---|---|
| 4,907,150 | 3/1990 | Arroyo et al. | 395/182.22 |
| 5,021,983 | 6/1991 | Nguyen et al. | 364/707 |
| 5,222,231 | 6/1993 | Gunji | 395/188.01 |
| 5,276,890 | 1/1994 | Arai | 395/750 |
| 5,283,905 | 2/1994 | Saadeh et al. | |
| 5,339,444 | 8/1994 | Nakajima | 395/750 |
| 5,343,436 | 8/1994 | Suzuki | 365/228 |
| 5,392,438 | 2/1995 | Gunji | 395/750 |

FOREIGN PATENT DOCUMENTS

| 2-294760 | 12/1990 | Japan . |
|---|---|---|
| 4-37916 | 2/1992 | Japan . |

*Primary Examiner*—Ayaz R. Sheikh
*Assistant Examiner*—Xuong M. Chung-Trans
*Attorney, Agent, or Firm*—Fay, Sharpe, Beall, Fagan, Minnich & McKee

[57] ABSTRACT

An information processing apparatus having a work suspend/resume function which allows operator to use a main memory shared by different processings even when work suspension information is saved therein. A system for allowing a same operational environment as that set up in one information processing apparatus to be easily implemented in another information processing apparatus. A main memory used by a CPU for execution of processings has a function for storing information concerning the state of the information processing apparatus prevailing at a time point when execution of a given processing is suspended by a CPU for allowing the suspended processing to be performed in continuation later on. When the suspension state information has already been stored in the main memory by a former user, the suspension state information is transferred to a removable nonvolatile storage device so that the CPU can perform other processing than the suspended one by using the main memory. The transfer of the suspension state information is performed by the CPU.

7 Claims, 13 Drawing Sheets

INFORMATION PROCESSING APPARATUS WITH WORK SUSPEND/RESUME FUNCTION

This is a continuation application of Ser. No. 08/405,093, filed Mar. 16, 1995 now abandoned.

BACKGROUND OF THE INVENTION

FIELD OF THE INVENTION

The present invention generally relates to information processing apparatuses such as personal computers, workstations or the like which are employed for information or data processings in performing office works and others. More particularly, the present invention is concerned with a technique for improving and enhancing operability or manipulatability of the information processing apparatus which is imparted with a work suspend/resume function.

In recent years, techniques for implementing the information processing apparatuses in a small size with light weight have made great progress to such extent that personal computers capable of operating with a power supply from an onboard battery are used widely for various practical applications. Under these circumstances, there also arises a demand for battery-powered workstations, and approaches for merchandizing them are now of great concern.

In reality, in conjunction with the information processing apparatuses of the type mentioned above, there have been proposed many power management/control schemes in an effort to extend the use life of the onboard battery by suppressing the power consumption to a possible minimum level. For example, there is disclosed in JP-A-2-294760 an information processing apparatus which is equipped with an automatic power-off function for automatically switching off the power supply to the apparatus when data input operation through a keyboard or the like input device remains not performed for a predetermined period. In that case, data generated for display is saved and stored in a temporary storage which is backed up by a battery in precedence to interruption of the power supply so that the data for display can automatically be resumed when the power supply to the information processing apparatus is reinstated.

However, in the information processing apparatus heretofore known, the storage or memory device employed as the destination for data saving is generally built unremovably in the information processing apparatus. As a consequence, it is impossible to resume or reinstate the work as suspended by using another information processing apparatus of the same type.

Besides, it is noted that in the personal computers and workstations known heretofore, the destination for the data to be saved is invariably or fixedly secured on an incorporated main memory (also referred to as the main storage, primary memory or conventional memory) or a hard disk drive (HDD) which is unremovably built in the information processing apparatus. As a consequence of this, when the data is resumed as mentioned above, many and unspecified persons can make access to the information concerning the situation or state prevailing at the time the work was suspended, thus incurring a problem with respect to the security of the information.

As an approach to deal with the problem mentioned above, there is disclosed in JP-A-4-37916 a technique for allowing a storage device designated for storing the information concerning the state at the time of suspension of work to be removably mounted on the information processing apparatus together with a technique for ascertaining whether or not the access to the information mentioned above is authorized by checking a password.

In this conjunction, it should however be mentioned that the conventional work suspend/resume functions inclusive of those based on the techniques mentioned above have been implemented on such presumption that a person who uses a given information processing apparatus is limited to a specific one, and activities for improving the operability or manipulatability as well as performance of the information processing apparatus are based on the above presumption. By contrast, however, in most of the practical applications, a single information processing apparatus is usually used by a plurality of persons in a sharing manner.

For the reasons mentioned above, when an information processing apparatus is left in the work-suspended state with the information concerning the state at the time of the suspension being saved in the main memory, another person who wants to use that information processing apparatus will encounter such difficulty that the memory area which is intrinsically to be used by the other person is much limited, involving degradation in the performance or capability of the information processing apparatus, to a disadvantage. Furthermore, there may arise such a situation that a program which demands a large area of the main memory for execution thereof can no longer be run on the information processing apparatus, resulting in another great disadvantage. Besides, no consideration has heretofore been paid to such a facility which allows a single operator to save the suspended state information for a plurality of works, respectively.

In addition, what the hitherto known techniques are of concern is only the saving of the information indicating the state and environment in which the information processing apparatus was operated before the suspension of work, and no consideration is paid to such arrangement which allows the operational environment set up in an information processing apparatus to be reestablished in another information processing apparatus. By way of example, let's suppose that a given information processing apparatus is operated by a certain person or operator in the operational environment which is specific to him or her and a work is suspended for some reason. In that case, when the operator wants to resume the suspended work in another information processing apparatus of a same machine type which is installed at a place remote spatially or temporally from the given information processing apparatus, he or she is forced to set up his or her own operational environment in the remote information processing apparatus for resuming the suspended work, which obviously means that a great burden is imposed on the operator. As will be recognized from the above, the conventional information processing apparatus having the data save/resuming function for allowing the work to be temporarily suspended is very poor in respect to the manipulatability or operability for the user.

SUMMARY OF THE INVENTION

In the light of the state of the art described above, it is an object of the present invention to provide an information processing apparatus which allows individual operators to use a storage unit or device such as a main memory shared for common use for different information processings without suffering any appreciable limitation even when information concerning the state of the information processing apparatus at the time when a work in progress was suspended is stored in the storage device.

Another object of the present invention is to provide an information processing system which is imparted with capability for allowing operational environment set up for an information processing apparatus to be easily reestablished in another information processing apparatus so that a work suspended in the former can smoothly be resumed for continuation thereof in the latter.

In view of the above and other objects which will become apparent as the description proceeds, there is provided according to an aspect of the present invention an information processing apparatus, which includes a processing unit for performing information processings, a first storage device responsive to suspension of a given one of the information processings for thereby storing requisite information concerning the state prevailing at the time of the suspension for allowing the suspended processing to be resumed later on and serving as a main memory used by the processing means in performing the information processings, and a second storage device to which the information of the state at the time of the suspension is transferred from the first storage device to be stored therein so long as the information is stored in the first storage device, wherein when the processing unit is to execute another information processing which is different from the suspended one by using the first storage device, the processing means transfers the information concerning the state at the time of the suspension to the second storage device from the first storage device.

In a preferred mode for carrying out the invention, the second storage device may be constituted by a nonvolatile storage device or medium which can removably be mounted on the information processing apparatus.

By virtue of the structure described above, the information processing apparatus which is in a sleep state (i.e., the state in which the power supply to the information processing apparatus was turned off with the information required for resuming the suspended processing being saved) can be used by other operator while enjoying substantially same performance as that of the information processing apparatus which is not in the sleep state but in a normal state. Parenthetically, as the information to be saved to the storage device upon transition of the information processing apparatus to the sleep state, there may be mentioned data including the contents held in a display-dedicated memory, contents of registers incorporated in peripheral devices such as a display controller, contents of a register or registers incorporated in a central processing unit or CPU and others which are required for resuming the processing being suspended. In this conjunction, a password or the like may be used for realizing a protect function which is validated upon resumption of the suspended processing in order to ensure security of the information.

In conjunction with the suspend/resume function, information concerning the state at the time of the suspension is usually saved onto a main memory for the reason that the access thereto can be accomplished at a high speed, whereby the time taken for resuming the processing as suspended can correspondingly be shortened or alternatively the information is saved onto a hard disk drive for the reasons that high reliability can be assured and that the power supply required for holding the saved information is unnecessary. According to another aspect of the present invention, there is also provided a hardware configuration in which a plurality of destinations for saving the information are provided so that the destination for saving the information can be selected as the user desires.

Further provided according to another aspect of the present invention is an information processing apparatus capable of detachably mounting thereon a removable nonvolatile storage device, which apparatus includes a store command unit for commanding storage of operational environment information used for setting up operational environment in the removable nonvolatile storage device mounted in the information processing apparatus, an operational environment setup command unit which responds to mounting of the removable nonvolatile storage device storing the operational environment information in the information processing apparatus for thereby commanding setup of the operational environment by referencing contents of the removable nonvolatile storage device as mounted, and a processing unit for executing predetermined processings in response to the commands issued by the command units mentioned above.

In another preferred mode for carrying out the invention, the information processing apparatus may be provided with a selecting device for selecting a part of the operational environment information and a selective store command unit for commanding storage of the selected part of information in the removable nonvolatile storage device.

When the store command unit issues a command for storing the operational environment information in the nonvolatile storage device mounted on the associated information processing apparatus, the processing unit responds to that command by executing a processing for storing the operational environment information in the nonvolatile storage device as mounted.

Furthermore, upon mounting of the nonvolatile storage device storing therein the operational environment information, the operational environment setup unit commands the setup of the operational environment for the information processing apparatus having the nonvolatile storage device mounted thereon by referencing the contents of the nonvolatile storage device. At the same time, in response to the operational environment setup command, the processing unit references the operational environment information stored in the mounted nonvolatile storage device to thereby execute the processing for setting up the operational environment dictated by the operational environment information as referenced.

In yet another preferred mode for carrying out the invention, the selecting unit may be so realized as to select a part of the operational environment information, which is then stored in the mounted nonvolatile storage device under the command of the selective store command device. In other words, the processing unit responds to the command of the selective store command unit to execute a processing for storing a part of the operational environment information selected by the selecting unit in the mounted nonvolatile storage device.

Through the procedures or operations elucidated above, the operational environment information and application programs is saved in at least one of the various recording media or mediums inclusive of the removable nonvolatile storage device or the like. Thus, by mounting the one storage medium or device on other information processing apparatus of the same function type, it is possible to set up the same operational environment on the other information and application programs processing apparatus by using the operational environment information as stored.

Further, by virtue of such arrangement that the information concerning the state at the time point of the work suspension is saved in the removable second storage device, resumption or reinstatement of the suspended work can easily realized by mounting the second storage device in the information processing apparatus of a same configuration exhibiting same functions. Thus, when the information processing apparatus of a same type or system configuration is installed at a remote place such as, for example, a place where operator is dispatched or visits on business, the operator can easily reopen or resume the suspended work at the remote place by carrying the nonvolatile storage device. Thus, the utilization efficiency of the information processing system can significantly be improved. Besides, by saving the information of concern in the removable nonvolatile storage device, management of the personal or private information can be facilitated which ensuring security of the information.

In this manner, when the information processing apparatuses having the identical functions are installed at remote places such as branch offices, customer's offices or the like, the operator who is pressed to go to such place on business or for any reason by suspending his or her work is only required to carry the removable nonvolatile storage device for reopening or resuming the suspended work for presentation or the like purpose in the information processing apparatus installed at the remote place without taking into consideration the application programs installed at the remote information processing apparatus. Thus, the business data processings and administrative services as a whole can be much facilitated.

Besides, by storing or saving the operational environment information in the removable nonvolatile storage device or medium, the personal information can easily be managed or administrated with an enhanced security. In addition, because of nonvolatility of the storage device or medium, the backup function for the operational environment information can be realized. Moreover, the information concerning the suspended work as well as the information associated therewith can be managed easily with high security in that any third party is inhibited from making access to the personal or private information.

As is apparent from the above, with the arrangements proposed by the invention, there is realized the information processing apparatus in which the use of the storage device such as a main memory shared for different processings is not limited even when the information concerning the work suspension is stored in the storage device.

The information processing apparatus according to the invention thus presents advantages and profits mentioned below.

(1) User or operator can selectively designate from removable nonvolatile storage devices or mediums a destination for saving data for realizing the work suspend/resume function.

(2) Because the suspended work or processing can be resumed in any information processing apparatus which belongs to a system or group of the same type by using the data saved in the removable nonvolatile storage device or medium, consistency in the data or information processing as well as operability thereof can significantly be enhanced.

(3) The personal management or administration of the information is facilitated with a high security.

(4) By taking protecting measures such as addition of a password or the like upon suspension of the work to be resumed later on, management of the access privilege can be realized.

(5) Because the operational environment information is stored in the removable nonvolatile storage device or medium, the same operational environment can be set up in other information processing apparatus of a same type on the basis of the operational environment information saved, whereby manipulatability of the information processing apparatuses can remarkably be enhanced without need for resorting to complicate and expensive measures.

(6) Owing to saving of the user's operational environment information in the removable nonvolatile storage device or medium, the backup function for the operational environment information can be realized, whereby shutdown of the information processing apparatus can easily and readily be coped with.

(7) Be storing the operational environment information specific to the individual user in the removal nonvolatile storage device or medium which the user can administrate, the third party is prohibited from accessing the operational environment information (inter alia the generated data). Thus, high security of the operational environment information can be guaranteed.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 1 is a flow chart showing a main routine of operation performed by an information processing apparatus when power supply thereto is turned on;

DESCRIPTION OF THE PREFERRED EMBODIMENTS

Now, the present invention will be described in detail in conjunction with what is presently considered as preferred or exemplary embodiments thereof by reference to the drawings.

Figure 2:
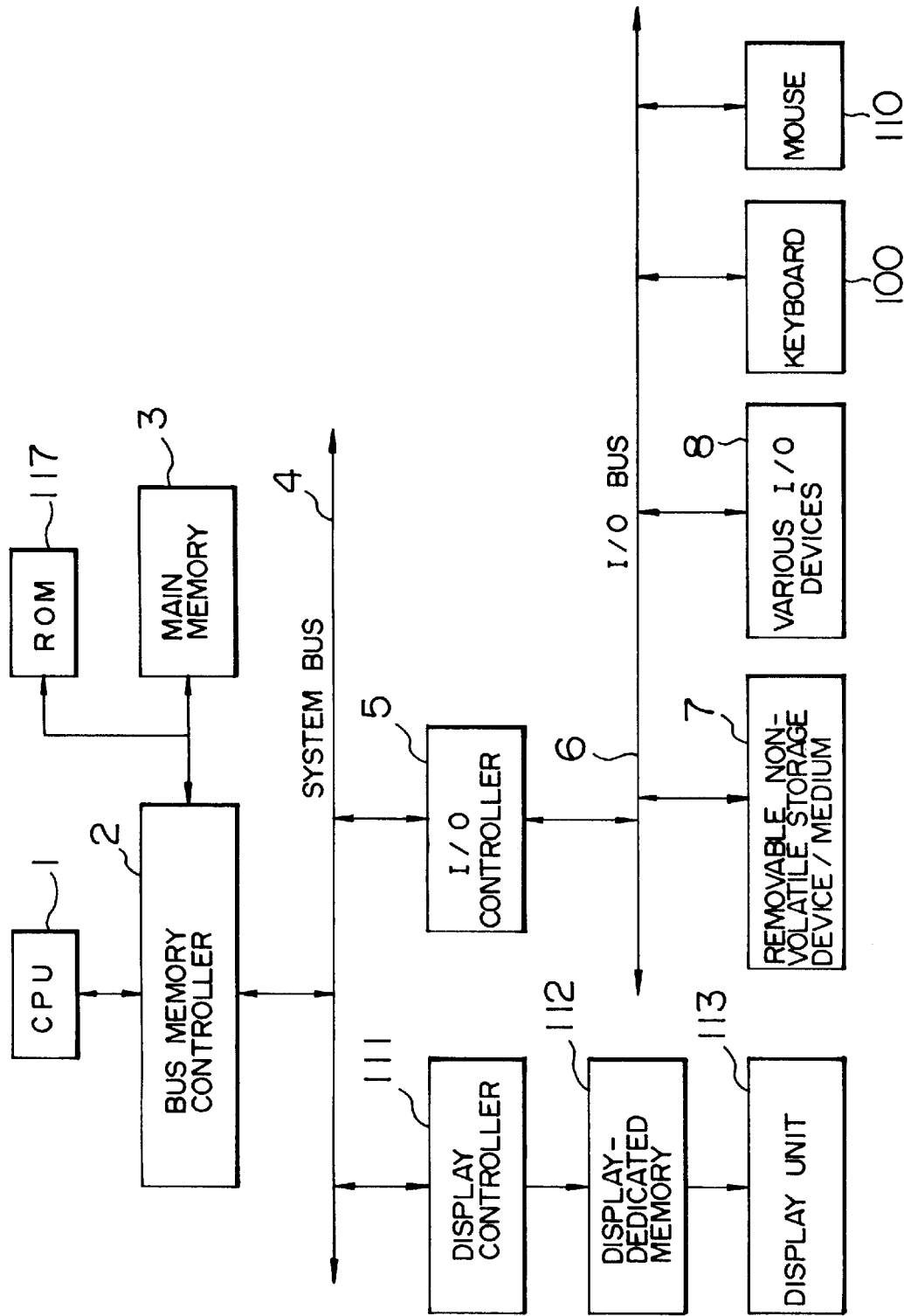
FIG. 2 is a block diagram showing, by way of example, a hardware structure of an information processing apparatus according to an embodiment of the present invention.

FIG. 2 is a block diagram showing, by way of example, a logical structure of an information processing apparatus such as a computer or work state to which the present invention can be applied. As can be seen from the figure, the information processing apparatus under consideration is comprised of a central processing unit (hereinafter referred to as the CPU in abbreviation) 1 for controlling operations of the apparatus as a whole in accordance with a program or an operating system (OS in abbreviation) stored previously in a read-only memory (hereinafter referred to as the ROM) 117 or a nonvolatile storage device as described hereinafter, and a bus/memory controller 2 which is in charge of controlling accesses to a main memory 3 of the CPU 1 and a system bus 4. The main memory 3 constitutes a storage device which can be utilized for saving temporarily data of concern upon activation of a save/resume function, while the system bus 4 serves for information or data transfers among the various constituent elements. Further, the information processing apparatus includes an input/output (I/O) controller 5 for controlling various input/output devices denoted representatively by a reference numeral 8 via an I/O bus 6 to which the various I/O devices 8 are connected, and a removable nonvolatile storage device or medium 7 such as a hard disk drive (HDD), a floppy disk drive (FDD), an IC card including a flush memory or the like which is provided with a predetermined interface. The various I/O devices 8 may be constituted by an HDD incorporated in the system, other information processing apparatus connected via a network, etc. Moreover, there are provided a display unit 113 which can be realized by a liquid crystal display device (LCD), a cathode ray tube (CRT) and others, a display-dedicated memory 112 for storing data to be displayed, a display controller 111 for controlling generation of displays on the display unit 113 from the contents of the display-dedicated memory 112 and a ROM 117 mentioned above.

Connected to the I/O bus 6 the removable nonvolatile storage device or medium 7, the various I/O devices 8, a keyboard 100 for inputting commands as required to the CPU 1 and a mouse 110 for commanding the CPU 1 as occasion requires.

Figure 3:
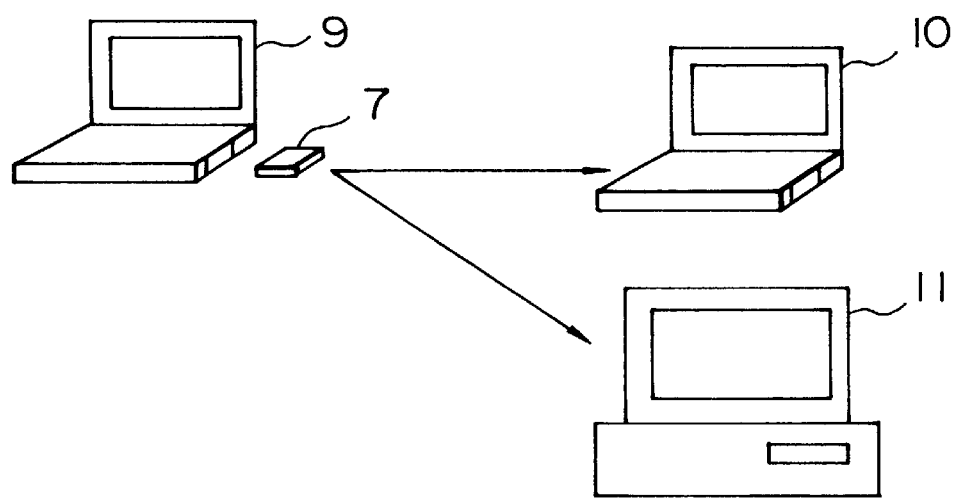
FIG. 3 is a schematic diagram for illustrating, by way of example, a mode for resuming a suspended work according to an embodiment of the invention.

FIG. 3 is a schematic diagram for illustrating, by way of example, a work resume or reinstate mode. In the figure, a reference numeral 9 denotes an information processing apparatus (A) in which a work is to be interrupted or suspended, and numerals 10 and 11 denote information processing apparatuses (B) and (C) which are compatible with the information processing apparatus (A) 9 in respect to hardware and software configurations and which are in the position to reopen or resume the work suspended in the information processing apparatus (A) 9.

Figure 4:
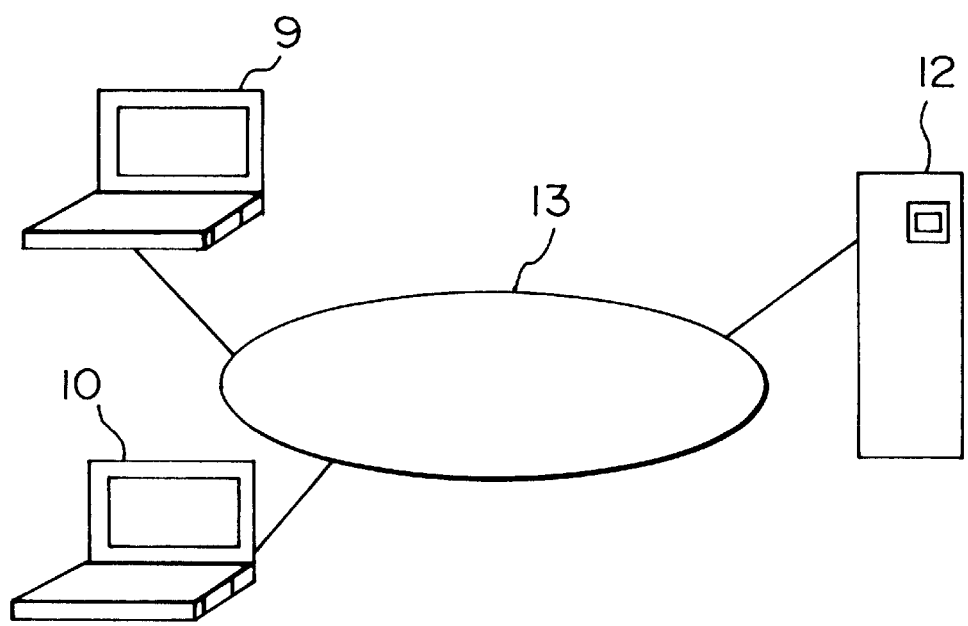
FIG. 4 is a schematic diagram for illustrating another example of work resuming mode in a computer system in which individual information apparatuses are interconnected via a network.

FIG. 4 is a schematic diagram showing another example of work resumption in a network system. In the figure, reference numeral 12 denotes a server system which is in charge of controlling databases and application software or programs in a centralized manner, a numeral 13 denotes a local area network (LAN) structuring a network among the server 12 and clients such as information processing apparatuses 9 and 10. In the client/server system under consideration, it is presumed that the databases and the application programs are stored in the server 12 to be managed thereby with the client(s) acquiring the information from the server 12 as occasion requires. In the LAN shown in FIG. 1, let's assume that the work executed by the client information processing apparatus 9 by making use of an application stored in the server 12 is interrupted or suspended. In that case, corresponding information is added to the work suspension information stored in the removable nonvolatile storage device or medium 7 by the server 12 so that the suspended work can easily be resumed by the client information processing apparatus 10 connected to the same network which is capable of reopening or reinstating the work being suspended. On the other hand, In the case where neither apparatus nor program for supporting the resumption of the suspended work are available in the network system, an error message is issued by the server.

Figure 1:
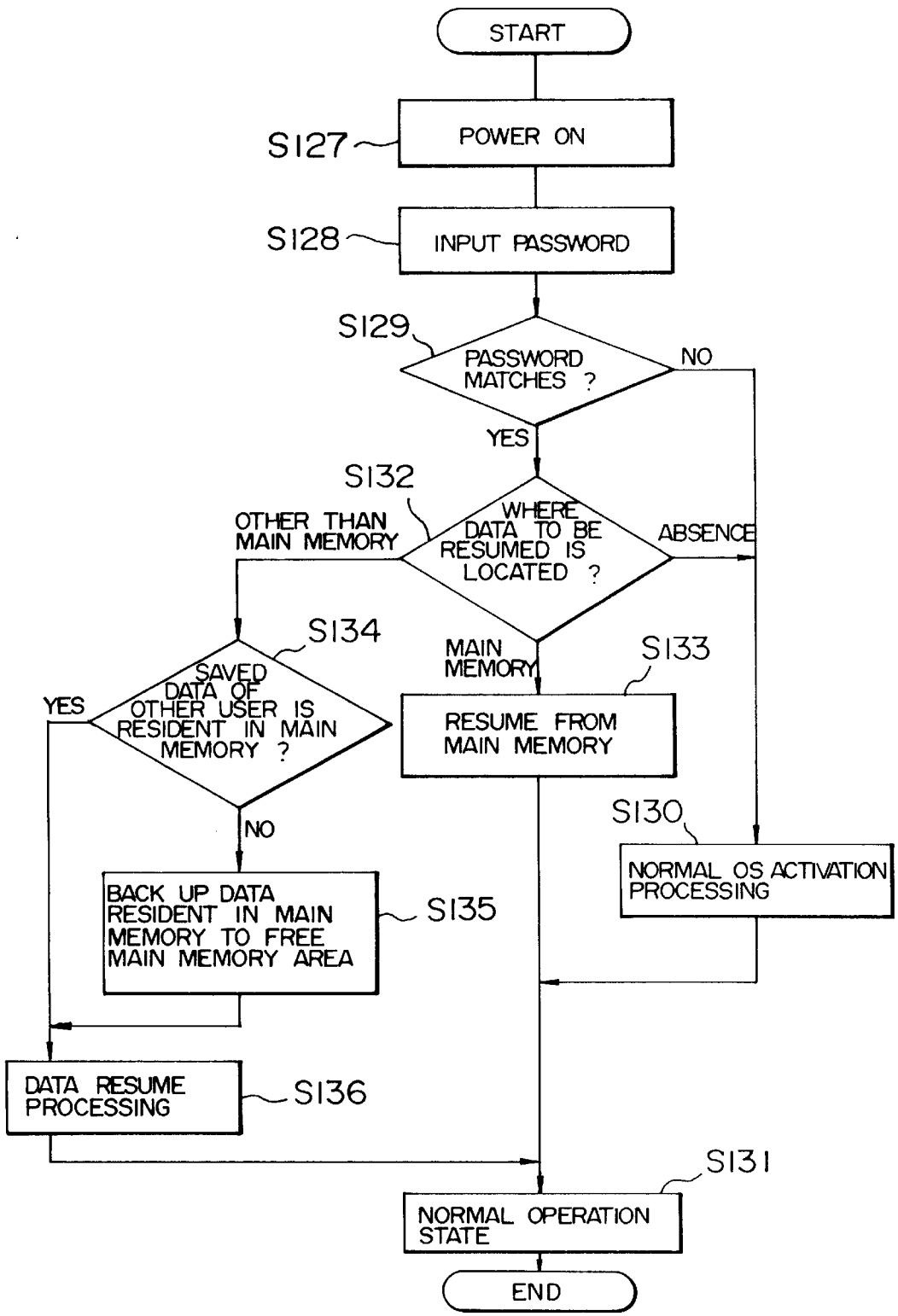

FIG. 1 is a flow chart showing a main routine executed upon resuming of an information processing apparatus. Referring to the figure, a power-on processing is performed in a step S127 for supplying an electric power to the information processing apparatus and activating the resuming operation, whereby all the devices incorporated in the information processing apparatus are supplied with electricity. In a step S128, a password is inputted by an operator, which step is then followed by a password check step S129 where the password as inputted is checked to thereby decide whether or not the operator is authorized to use the information processing apparatus and whether or not the work suspension information relevant to the operator exists.

When it is found in the step S129 that no work suspension information relevant to the operator is present (i.e., when the answer of this step S129 is "NO"), the processing proceeds to a normal OS start normal power on sequence or activation processing step S130, whereby the information processing apparatus is caused to transit to a normal operation state (a step S131) for allowing the operator to perform transaction with the information processing apparatus. Parenthetically, unless the operator is registered as an authorized user, he or she may be logged in the system in terms of what is called the super user. In that case, the user identifier and the password may be registered in a conventional manner in the information processing apparatus personal computer or workstation.

When no problem arises in the password matching step S129 (i.e., when the answer of this step "YES"), decision is then made in a step S132 where the data to be restored is located. Unless no data is available for the restoration, the normal OS activation processing is executed in a step S130.

When the work suspension information (i.e., information concerning the state prevailing in the information processing apparatus at the time the work was suspended) is present in the main memory, a resume processing is performed on the basis of the information stored in the main memory 3 in a step S133, whereupon transition is made to the normal operation state (step S131).

When the work suspension information is held or stored in other location than the main memory, decision is made as to whether or not saved data of the other use is present in the main memory 3 (step S134). When the work suspension information of the other user exists in the main memory 3, that work suspension information or data is backed up to release or free the main memory in a step S135, and the data restore processing is then executed for restoring the data from the other data-saved location than the main memory 3 in a step S136, whereupon transition is made to the normal operation state (step S131).

Unless the work suspension information of the other user is present in the main memory, the data restore processing from the other location than the main memory can straightforwardly be performed in the step S136 without executing the back-up processing mentioned above, which is then followed by the transition to the normal operation.

As will be apparent from the foregoing description, a single information processing apparatus can be used by a plurality of users without fear of the work suspension information being made available to the other operators than the authorized person, whereby security of the data can be ensured. Besides, there can be avoided the possibility of the work suspension information of the other users being inadvertently be erased. Thus, safety of data can be ensured. In addition, a plurality of work suspension information can be saved in a single information processing apparatus an the work suspended can be reopened on the basis of the work suspension information as desired.

At this juncture, it should be mentioned that the password input processing (step S128) and the password match processing (step S129) may of course be spared when they are considered as being unnecessary.

Furthermore, such arrangement may equally be adopted that the location destined for saving the data can be accessed by using any other types of ciphered codes than the password which is known only to the relevant authorized user so far as high security can thereby be ensured.

In another mode for carrying out the present invention, such arrangement may also be adopted that the structure, capacity and other information of storages incorporated in the information processing apparatus which can be used as a saving destination area are displayed in the form of a list or menu program so that the user can easily designate the storage device which is to serve as the data saving location. When the resuming processing is to be effectuated, starting from a removable nonvolatile storage device, such an arrangement may be adopted that the location of an application program required for the determination of presence or absence of the removable nonvolatile storage device as well as for the resuming operation is confirmed by software incorporated in an initialization program or the operating system (OS).

Figure 11:
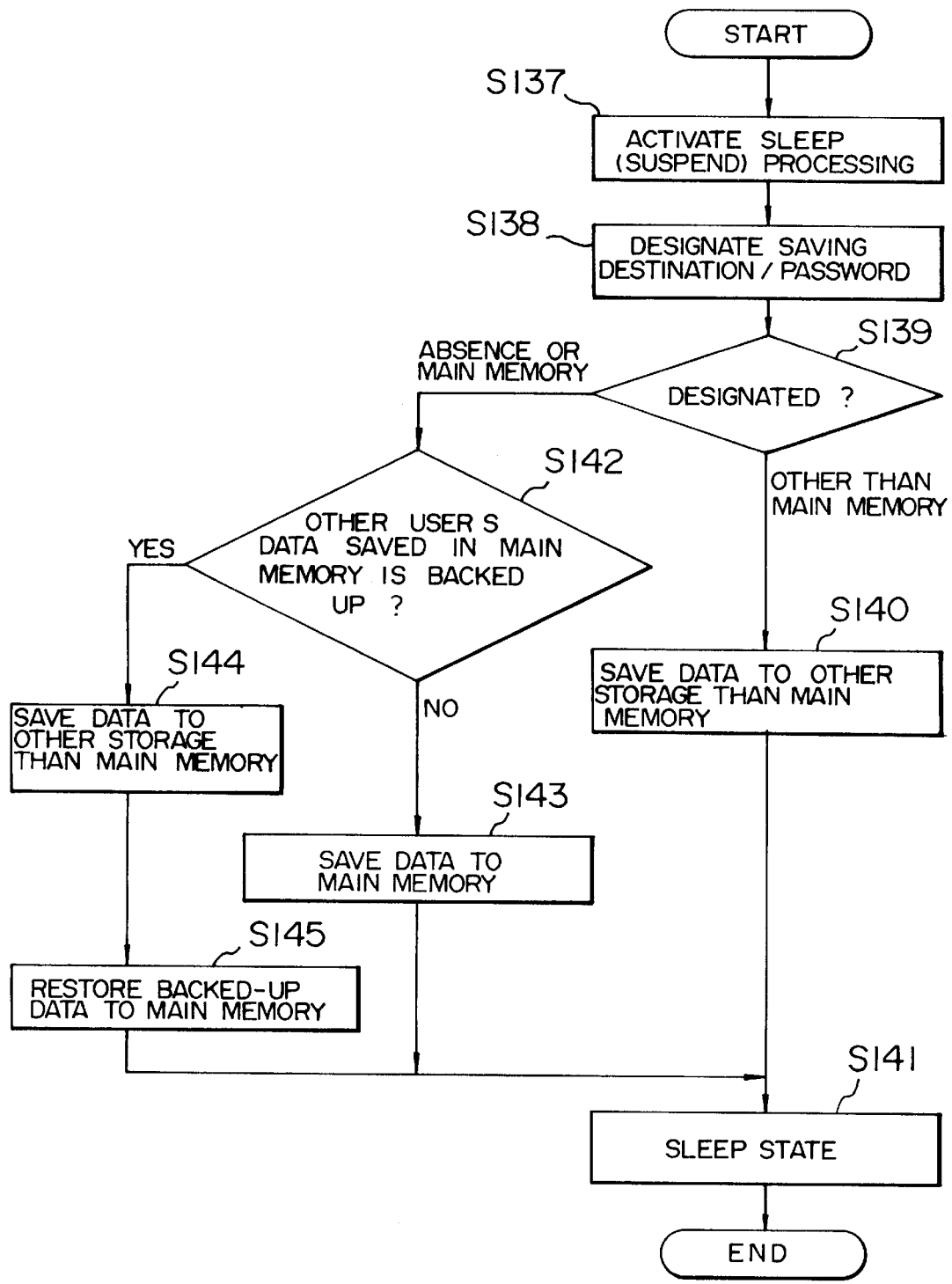
FIG. 11 is a flow chart showing a main routine for setting an information processing apparatus to a sleep state according to an embodiment of the invention.

FIG. 11 is a flow chart showing a main routine for setting an information processing apparatus to a sleep state. Referring to the figure, when the suspended work state information is to be temporarily saved, a command for transition to the sleep state is issued by a sleep activating processing in a step S137. The operator can arbitrarily determine which of the storage devices is to be selected for saving the work suspension information through a saving destination/ password designating processing (step S138). Subsequently, in a step S139, decision is made whether the data saving destination is designated or not. When other storage device than the main memory is designated, a saving processing for saving the relevant data in the designated storage device is executed in conformance with the designated destination in a step S140.

Unless the data saving destination is designated or when the main memory is designated as the saving destination, it is then checked in a step S142 whether or not backup data for other user(s) is resident in the main memory, which is then followed by the step S135 (FIG. 1) where the main memory region is released. When no backup data is resident, the processing for saving the data to the main memory 3 is executed, whereby the information processing apparatus is switched to the sleep state (step S141). In that case, when the saving destination for other operator is changed in the processing step S144, a message function may be added to the saving destination/password designation processing in the step S138 to thereby make available the information messaging the change of the saving destination to the other operator. On the other hand, unless the data saving destination is designated, the main memory which can be accessed at a high speed may preferably be selected as the saving destination with preference over the other storage device, whereby the time taken for the transition of date as well as recovery can be shortened, which in turn involves improvement of operation performance.

When the backup data mentioned above is present, this fact is informed to the operator or user, whereon the processing for saving the data to other storage device than the main memory is executed in the step S144. Subsequently, processing for restoring the backup data to the main memory is executed (step S145) to thereby restore the information processing apparatus to the state before it is used, and transition is made to the sleep state (S141).

Figure 10:
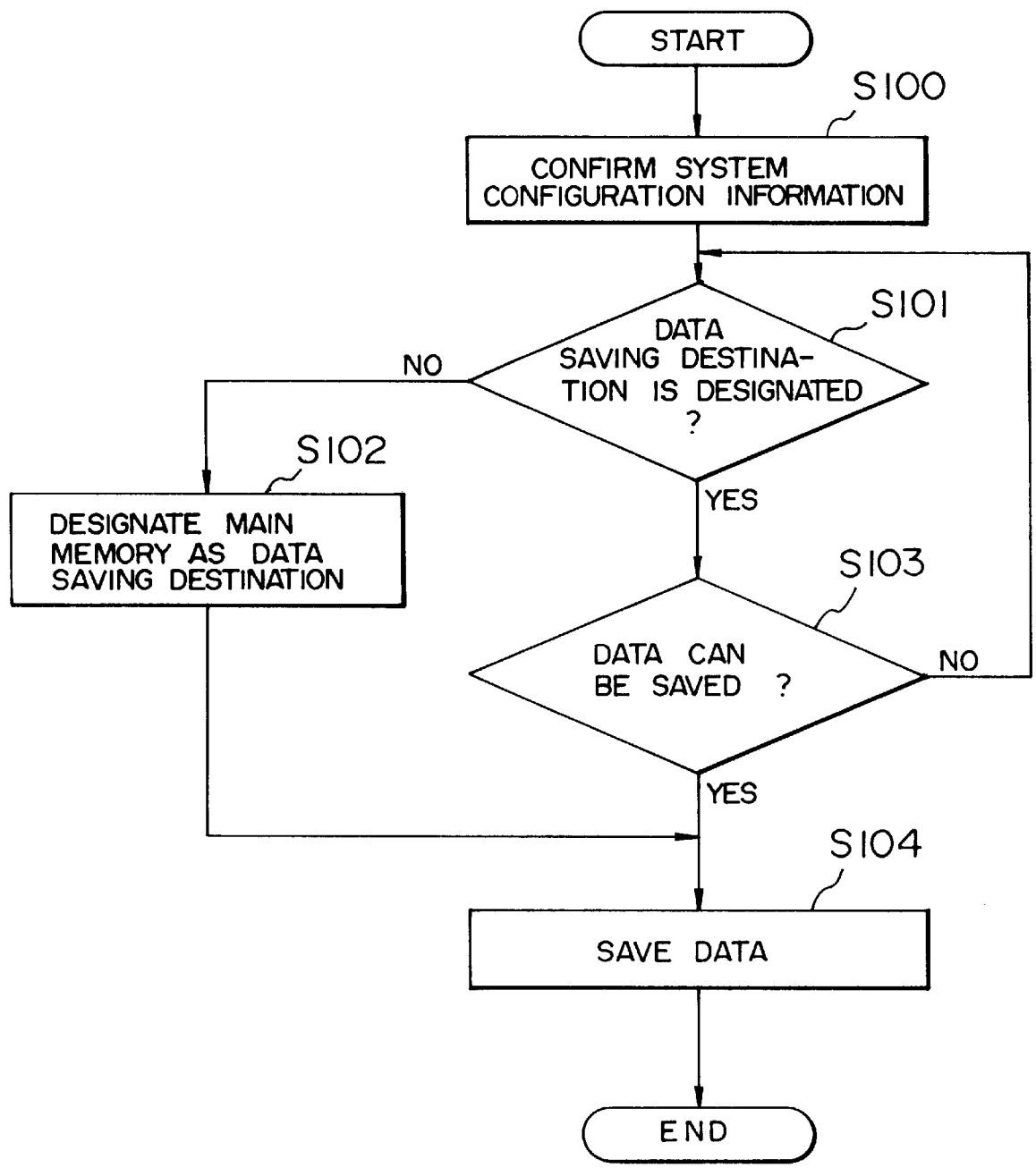
FIG. 10 is a flow chart for illustrating a processing for designating a data saving destination according to a further embodiment of the present invention.

FIG. 10 is a flow chart for illustrating processings for designating the data saving destination according to another embodiment of the present invention. Referring to FIG. 10, the information processing apparatus executes an initial state diagnosis program loaded for diagnosing memories incorporated therein for determining the capacities thereof, various I/O devices and others to thereby obtain information concerning the system configuration of the information processing apparatus (step S100), which information is then transferred to the OS. To this end, a data saving destination designating application is installed in the OS. In a step S101, the user designates a data saving destination. In case the data saving destination is not designated, the main memory is automatically designated as the data saving destination (step S102). In this case, the time taken for setting the information processing apparatus to the sleep state as well as the time for restoring the information processing apparatus can be shortened, to an advantage. On the other hand, when the data saving destination is designated, presence of the data saving destination designated by the user is confirmed on the basis of the system configuration information mentioned previously, whereupon decision is made whether or not the data can be saved in the designated data saving destination in a step S103. When it is decided that the data can not be saved in the data saving destination as designated, a message informing the absence or unavailability of the designated data saving destination is issued by the aforementioned data saving destination designating application program, to thereby allow the user to designate again another data saving destination.

In this conjunction, it is to be added that by preparing the data saving destination designating application program such that the available data saving destinations are presented to the user in the form of a menu (i.e., by a menu program), re-designation of the data saving destination can be facilitated.

On the other hand, when it is decided that the data can be saved to the designated data saving destination, the data saving processing (step S104) is executed. Thus, the data saving to the data saving destination designated by the user is completed. The data saving destination designating application program may be so prepared as to admit or accept the designation of the data saving destination when the user pushes, for example, a sleep processing activation button or key in the course of execution of the work suspending processing.

At this juncture, it should be mentioned that the data saving destination designating application program may be contained in a menu program which is adapted to generate a menu after activation of the OS for allowing the user to selectively input various designation. In that case, the need for the user to necessarily designate the data saving destination upon every activation of the sleep processing can be avoided, whereby manipulation or operation efficiency can be enhanced, to another advantage.

Figure 5:
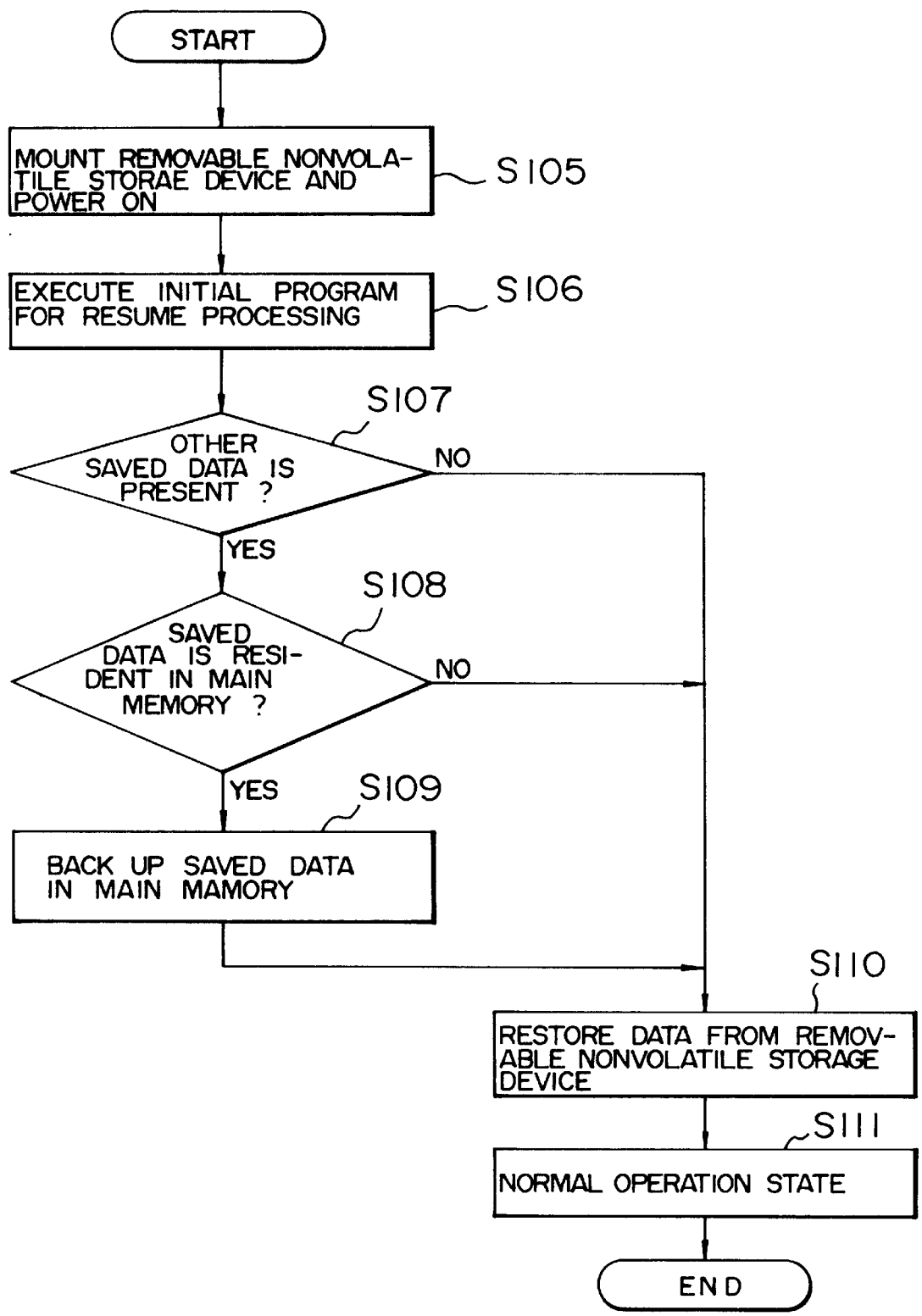
FIG. 5 is a flow chart for illustrating processings involved in reopening or resuming a work being suspended, starting from a removable nonvolatile storage device, according to an embodiment of the invention.

FIG. 5 is a flow chart for illustrating processings for reopening or resuming the work being suspended, starting from a removable nonvolatile storage device. Referring to the figure, the removable nonvolatile storage device is mounted on the information processing apparatus of concern and the latter is powered on in a step S105. Upon power-on of the information processing apparatus, an initialization/diagnosis program is executed, which program includes a resume processing routine and a data restoration decision processing routine for deciding whether the power-on is conventional one or it is to be accompanied with execution of the resume processing. Besides, the initialization/diagnosis program identifies discriminately the storage devices connected before and after the power-on, whereupon an initial program for the resume processing is executed for selecting the removable nonvolatile storage device or medium 7 from which the data is to be restored (step S106). Further, with this initial program, it is confirmed whether or not the removable nonvolatile storage device or medium 7 has been mounted in the information processing apparatus and whether or not the saved data is present in the removable nonvolatile storage device or medium 7. Additionally, decision is made as to presence or absence of the data which has been saved by the other operator to thereby determine whether the work suspension information is saved in the information processing apparatus 10 or 11 which is in the position ready to reopen or resume the work being suspended (step S107). This decision may be effectuated by referencing a register holding the corresponding information concerning the presence/absence of the saved data. In this conjunction, it will readily be understood that when the other user has saved the work suspension information in the main memory 3 backed up by a battery, the main memory 3 can not be used when the work is reopened by using the removable nonvolatile storage device or medium 7. To solve this problem, the decision as to presence or absence of the saved data in the main memory 3 is effected in a step S108 by referencing the register holding the corresponding information, as mentioned above. When the saved data is present in the main memory 3, a processing for backing up the saved data present in the main memory is performed to thereby protect the work suspension information of the other user from being erased or lost. When neither work suspension information nor saved data exists in the main memory 3 or when the backup processing for the saved data in the main memory 3 has been completed, the processing for restoring the saved data from the removable nonvolatile storage device or medium 7 is performed in a step S110, whereupon the information processing apparatus makes transition to the normal operation state (step S111). In this manner, the work suspended in the information processing apparatus 9 can readily be reopened by the other information processing apparatus such as the information processing apparatus 10 or 11 without incurring any possibility of the information of the other user being lost while ensuring high utilization efficiency of the information processing apparatuses.

By adding the function for confirming the storage location for the restoration and designation thereof to the resume processing as the initial routine as described above, the suspended work can be restored from a desired one of the storage devices. By way of example, the suspended work can readily be restored from a floppy disk drive or Rom by making use of a debug function realized by executing an appropriate test program. It should however be mentioned that the processing for backing up the saved data from the main memory 3 is indispensable.

Upon completion of the suspended work reopen or resume processing, starting from the removable nonvolatile storage device or medium 7 as described above, the data or information as backed up is restored to the original state, so that the operational environment for the other user can be reestablished.

Figure 6:
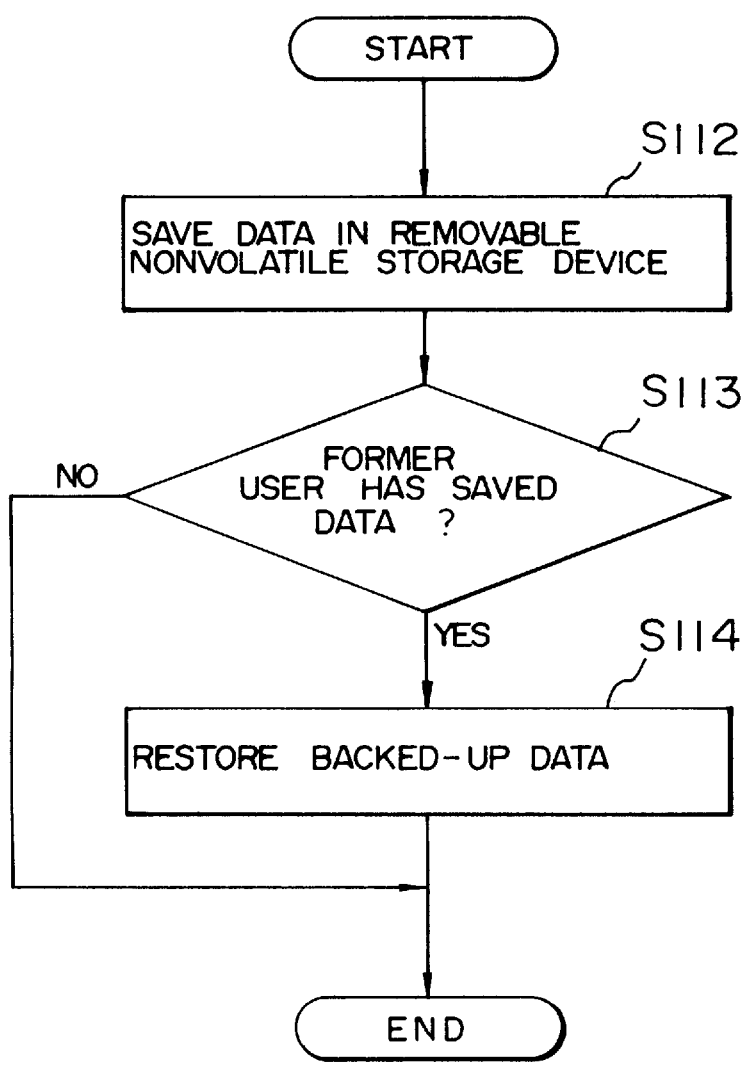
FIG. 6 is a flow chart for illustrating a data saving process.

FIG. 6 is a flow chart for illustrating the restore processing described above. In order to allow the former user (i.e., the other user mentioned hereinbefore) to restore the work in the information processing apparatus 10 or 11 in which the saved data in the main memory 3 has been backed up, the data of the user who is currently operating the information processing apparatus 10 or 11 is saved to the removable nonvolatile storage device or medium 7 in a step S112. Subsequently, presence or absence of the saved data of the former user who used the information processing apparatus 10 or 11 in precedence is determined in a step S113. When the saved data exists, a processing for restoring the backed-up data is executed in a step S114, whereon the restoration processing now under consideration comes to an end. In this manner, even when the work of the former user is suspended with the information processing apparatus being set to the sleep state, he or she can reopen the work from the suspended state in one and the same information processing apparatus.

Figure 7:
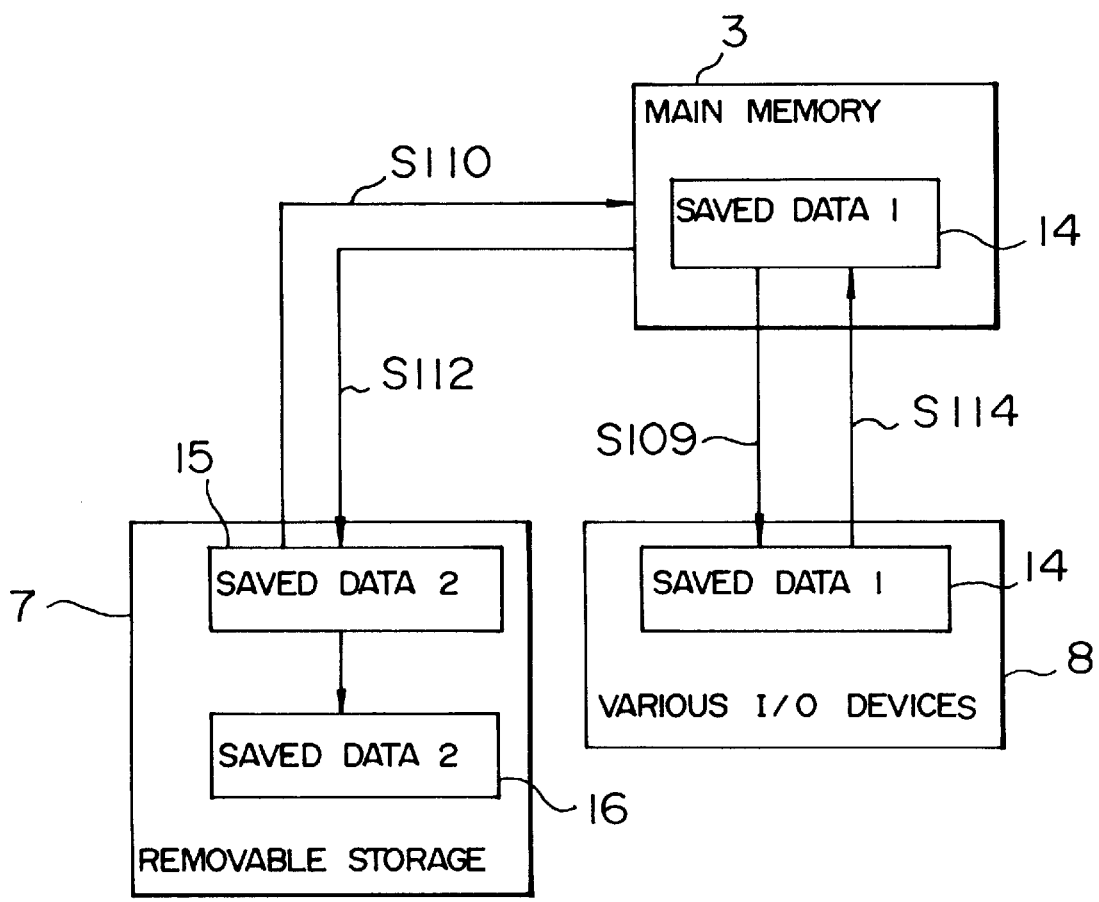
FIG. 7 is a diagram for illustrating flows of data in another mode of data saving and restoring processings.

FIG. 7 is a block diagram for illustrating flows of data in the processing procedure for restoring the information of a new user while backing up automatically the information of a former user. The processing shown in this figure is activated with the step "START" shown in FIGS. 5 and 6 as a momentum. In the first place, a processing for backing up the information (saved data "1") of the former user from the main memory 3 to a given one of the various I/O devices 8 is executed in a step S109. Thus, the main memory 3 is freed or opened as a user memory location for the current user who is going to reopen the work, starting from the removable nonvolatile storage device or medium 7. Subsequently, the saved data "2" which represents the work suspension information is transferred from the removable nonvolatile storage device or medium 7 to the main memory 3 to be developed thereon. Thus, the information processing apparatus is restored to the normal operation state capable of restarting the work being suspended (step S110). After completion of the work, the data "2" to be newly saved is stored in the removable nonvolatile storage device or medium 7 in a step S112. Subsequently, the saved data "1" is restored onto the main memory 3 from the given one of the various I/O devices 8 in a step S114. With the processing procedure described above, the main memory 3 can be freed for reopening the suspended work while ensuring security for the data of the former user. Besides, the time required for the restoration can significantly be decreased.

Now, description will be directed to another exemplary embodiment of the information processing apparatus with which a security function can be realized according to the present invention.

Figure 8:
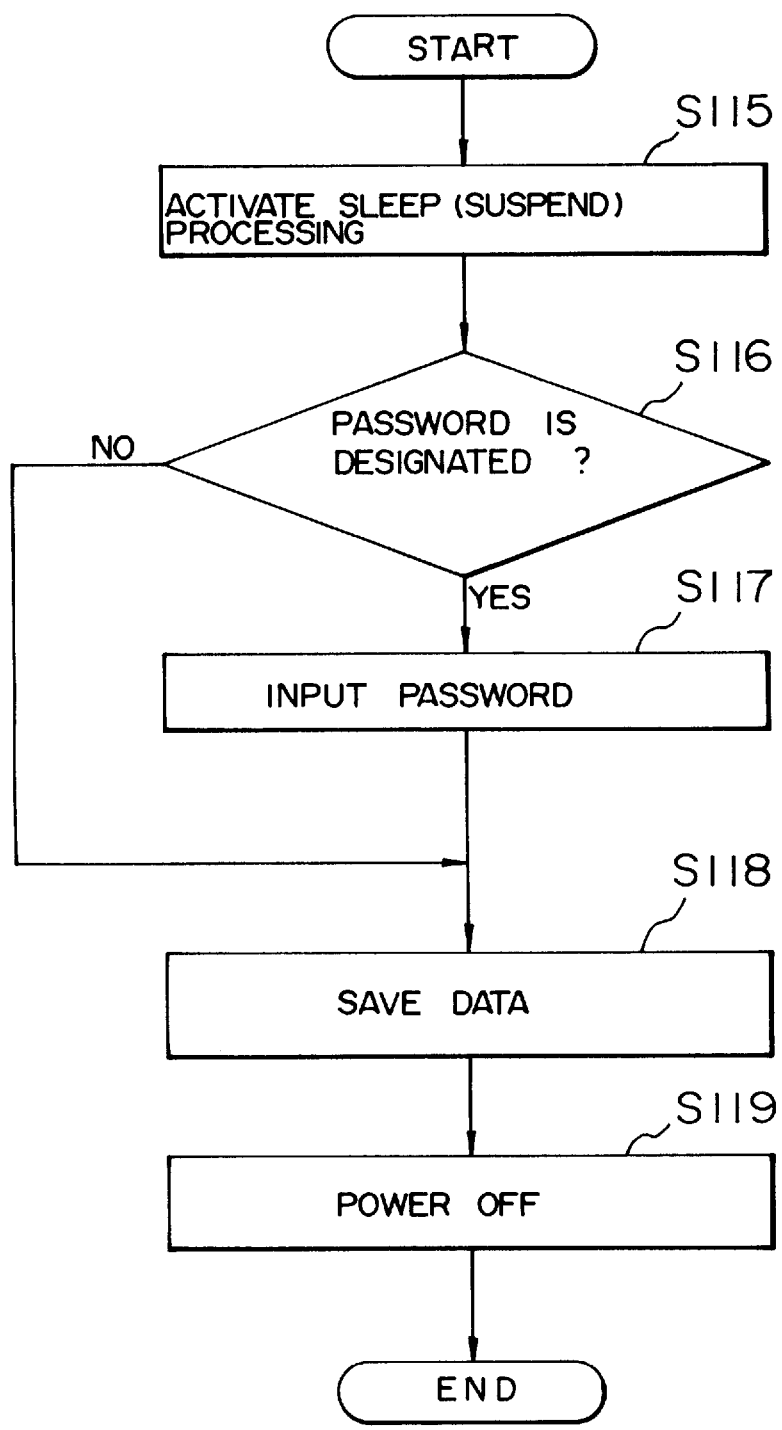
FIG. 8 is a flow chart for illustrating operation involved in data saving processing for realizing a security or protect function by using a password according to still another embodiment of the present invention.

FIG. 8 is a flow chart for illustrating operation involved in the data saving processing for realizing a security function by using a password according to another embodiment of the present invention. For softwarewise implementation, a data saving command is issued upon activation of a sleep processing in a step S115. To this end, the user is inquired of whether he or she desires to designate his or her password in a step S116. When the user desires to input the password, this is performed in a step S117. In succession, data saving processing is executed in a step S118, which is then followed by a power-off processing (step S119), whereupon the processing under consideration comes to an end.

In the conventional workstation or the like, the users are previously registered so that the person who desires to use the workstation is usually required to input the login name and/or the password. Accordingly, activation of the sleep processing can automatically be realized by using intact the password upon login of the information processing apparatus. Besides, the user can selectively effectuate the protection of data in dependence on the degree of security of the data. Next, description will turn to operation involved in the restoration procedure based on the resume function.

Figure 9:
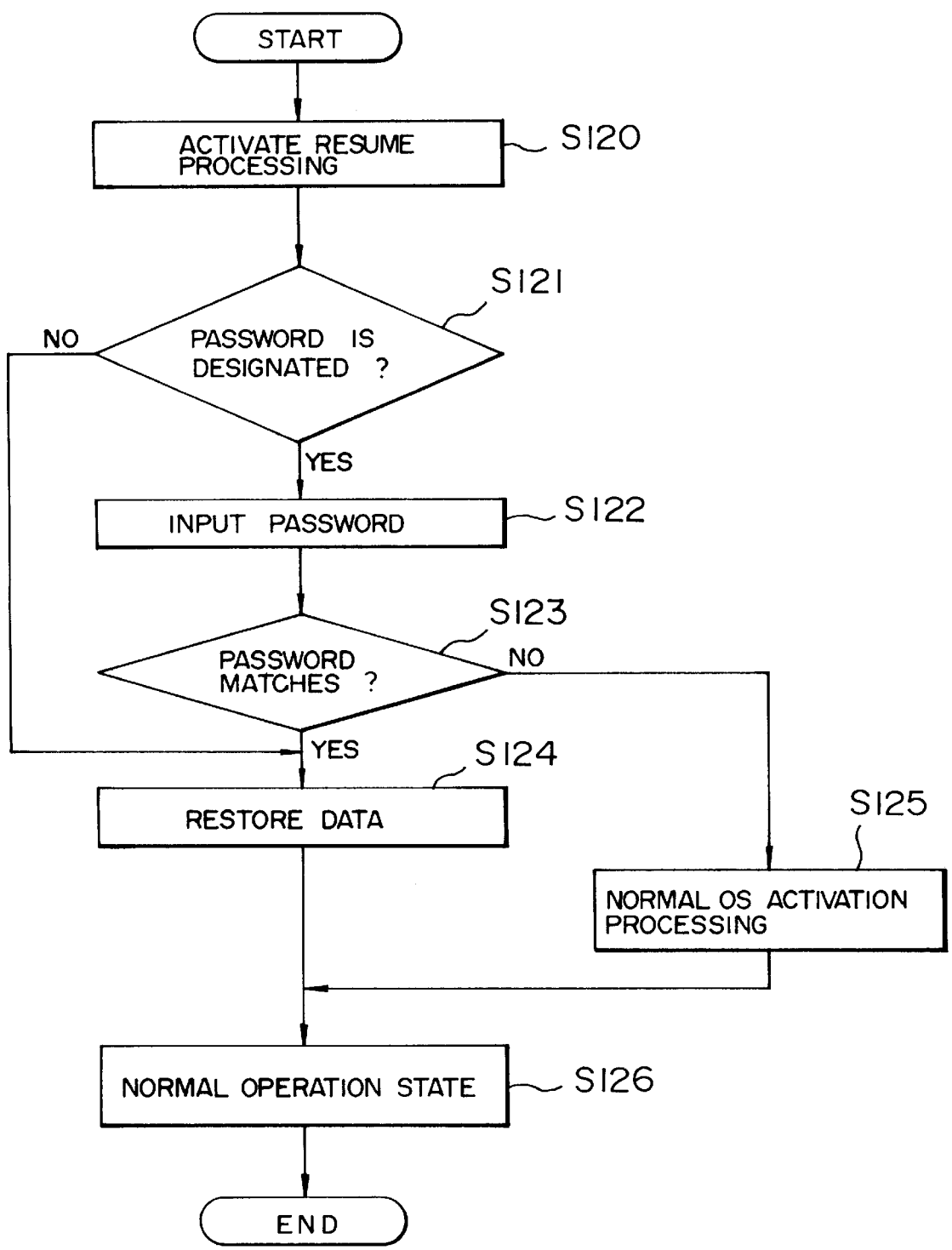
FIG. 9 is a flow chart for illustrating operations involved in a data resumption or restoration procedure for realizing a protecting function by using a password according to yet another embodiment of the present invention.

FIG. 9 is a flow chart for illustrating operations involved in a restoration procedure for realizing the protecting function by using a password. After activation of the resume processing in a step S120, the register holding the password information is referenced to thereby decide whether the password is designated or not (step S121). When it is found that the password is present, the password is inputted (step S122), whereupon the password is checked (step S123). When no problem arises in the password matching (i.e., when the answer of this step is "YES") or when no password is designated (step S121), the data is restored (step S124). On the contrary, when any problem arises in the password check or matching (i.e, when the answer of the step S123 is "NO"), the normal or conventional start processing is performed in a step S125. Thus, the information processing apparatus makes transition to the normal operation state ready for performing works in the normal or conventional mode (step S126). This processing may be combined with the backup processing described previously. By protecting the saved information, as described above, it is possible to inhibit a third party from making access to the saved data. Consequently, high security can easily be achieved.

The present invention may equally be applied to a high integrated and intelligent hardware configuration. Further, it goes without saying that the present invention can be applied to the removable nonvolatile storage device or medium 7 in the information processing apparatuses interconnected via a network as well.

It should further be mentioned that although the information processing apparatus is implemented in such hardware structure as shown in FIG. 2, the main memory 3 and the ROM 117 may be directly connected to the CPU 1 in the case where the CPU 1 is integrated with high density and provided with a memory interface.

In the following, other exemplary embodiments of the present invention will be described. For having easier and better understanding, description will first be made by reference to FIG. 3 on the assumption that each of the information processing apparatuses is imparted with at least a same function to read contents of storage and perform a predetermined processing procedure when the removable nonvolatile storage device or medium 7 is mounted.

It is further assumed that the information processing apparatus 10 and the information processing apparatus 11 are installed at a location or locations remote from the place where the information processing apparatus 9 is installed, as exemplified by a branch office, customer's office or the like place. On the assumption, let's suppose a scenario that the user of the information processing apparatus 9 suspends once a work being carried out by using the information processing apparatus 9 and desires to resume smoothly the suspended work at the remote place.

When the user performs works by using the information processing apparatus 9, he or she usually sets up operational environment (i.e., environment for operation) specific to him or her. With the expression "setup of the operational environment", it is contemplated to mean the setting-up of various parameters such as setting up of communication address value when the information processing apparatus 9 is connected to a communication line, setup of various parameters employed in an application software being used and others which are required for allowing the information processing apparatus to exhibit the functions desired by the user. Further, a phrase "operational environment information" as used hereinafter means the information required for structuring or establishing the operational environment, which information is to be referenced upon setting-up of the operational environment.

In the case of the instant embodiment of the present invention, it is presumed that when a work carried out by using the information processing apparatus 9 is suspended, the operational environment information at that time point is stored in the removable nonvolatile storage device or medium 7 and that the user visits a remote place on business or for any other purpose by bearing only the removable nonvolatile storage device or medium 7 which is implemented in a small-size structure of light weight excellent in the potability. At the remote place, the user mounts the removable nonvolatile storage device or medium 7 in the information processing apparatus 10 or the information processing apparatus 11 installed at that place. Then, the information processing apparatus 10 or the information processing apparatus 11 reads out the contents from the removable nonvolatile storage device or medium 7 as mounted, i.e., reads out the operational environment information to perform the processing for establishing the same operational environment as that of the information processing apparatus 9.

By carrying the to the remote place removable nonvolatile storage device or medium 7 or the like which exhibits excellent portability, the same operational environment as the one which is set up usually can easily be realized, whereby the manipulatability of the information processing apparatus can significantly be enhanced.

Suppose, by way of example, that such situation arises in which a person who is creating a document by using a word processor application software loaded in an information processing apparatus is forced to make a business trip to a certain remote place immediately. In that case, he or she can store the document data being created in a storage medium and continues creation of the document by using an information processing apparatus installed at the remote place. In that case, by storing the operational environment information such as mentioned above in the removable nonvolatile storage device or medium 7, the setting-up of the information processing apparatus at the remote place can significantly be facilitated. By way of example, there arises no necessity for newly loading initial parameters for establishing the operational environment for the word processor application program of concern such as those exemplified by parameters for selection of fonts, setting of character size, designation of a line number, print format and other. Of course, the word processor application software is not always loaded in the other information processing apparatus installed at the remote place. In precaution against such case, the word processor software itself may equally be stored in the removable nonvolatile storage device or medium 7 so as to be used even in the other information processing apparatus installed at the remote place for allowing the work of creating the document to be continued at that place.

Figure 14A:
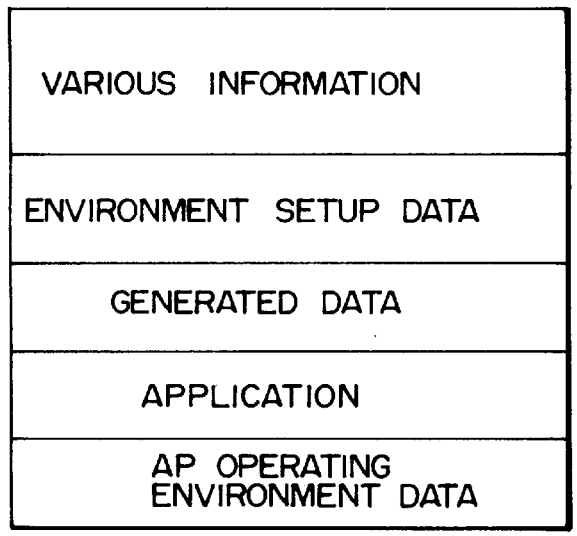
FIG. 14A is a view showing an example of operational environment information.
Figure 14B:
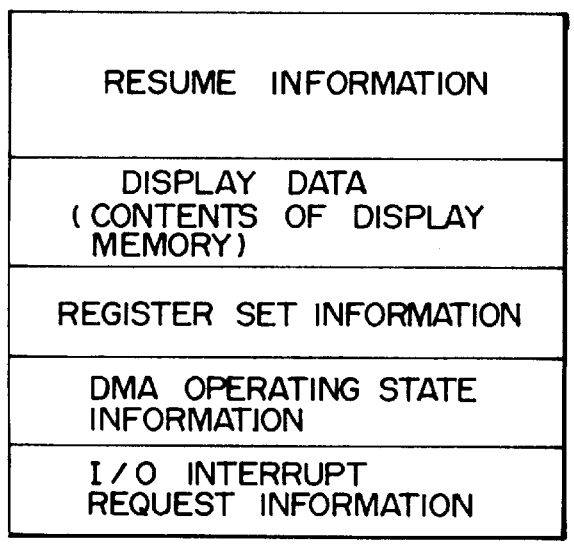
FIG. 14B is a view showing another example of operational environment information.

FIG. 14 is view illustrating, by way of example only, the operational environment information mentioned above. As the operational environment information, there may be conceived various information shown in a table 140 and resuming information (i.e., information for resumption) listed in a table 142. By handling the resuming information as the operational environment information, the work once suspended can smoothly be resumed and continued in the other information processing apparatus. Parenthetically, the information may selectably be displayed in the form of a menu so that only the selected information is allowed to be processed as the operational environment information.

As the various information shown in a table 140, there may be mentioned, for example, "environment setup data" such as data read out upon power-on of the information processing apparatus as typified by configuration information for personal computers, resource files for workstation and the like, "generated data" generated and stored in the form of a database, "applications" such as spreadsheet programs, word processor programs, drawing programs and the like software which can run on the information processing apparatus, "operational environment data for applications" such as parameters for setting add-on software used by application software, parameters for printer output formats and the like. It should however be understood that the invention is never restricted to the information or data enumerated above.

On the other hand, as the resume information shown in a table 142, there may be mentioned, for example, "data for display" such as data to be displayed on a display screen, typified by "contents of video memory", "register-set information" such as information concerning set values in various registers employed in the information processing apparatus, "DMA state information" such as information indicating the direct memory access (DMA) state at the time of suspension in the information processing apparatus in which the DMA scheme is adopted, "I/O interrupt information", i.e., interrupt information from various I/O devices incorporated in the information processing apparatus and the like. Of course, it should be understood that the invention is never restricted to the information enumerated above.

Besides, when the information processing apparatus 9 is connected to a network such as a LAN (Local Area Network), the network setup information such as IP addresses, name of connected host and the like may be handled as the operational environment information. Furthermore, information concerning the capacities of the main memory of the information processing apparatus which is allocated to a RAM, I/O port setup information and the like may equally be handled as the operational environment information.

As the removable nonvolatile storage device 7, there may be mentioned a HDD equipped with a predetermined interface, while as the removable nonvolatile storage medium 7, there may be mentioned a memory card, a floppy disk, a magneto-optic (MO) disk, a compact disk (CD) and the like on which read/write operation can be performed. Parenthetically, it should be mentioned that the phrase "removable nonvolatile storage device or medium" used herein also covers such a driver device in which a recording medium can removably be mounted and which allows read/write operation to be performed on the removable recording medium as mounted.

Now, the instant embodiment of the present invention will be described by reference to the drawings.

In the information processing apparatus 9, software such as OS, application programs and others are usually loaded in a build-in hard disk drive which constitutes one of the various I/O devices 8. Further, a user-specific system file (or resource file in the case of the workstation) is prepared and stored in the hard disk drive for the purpose of setting up a user-specific operational environment in the information processing apparatus on the basis of configuration information read out when the information processing apparatus is powered on.

When a work being carried out is to be suspended, this can be commanded by manipulating the keyboard 100 or by pointing or click a corresponding command displayed in a menu by using a mouse. The CPU 1 then responds to the input command to thereby supply a control signal to the I/O controller 5. Under the control of the I/O controller 5, the operational environment information concerning the state of the information processing apparatus at that time point such as the system configuration, applications and others is saved in the removable nonvolatile storage device or medium 7.

By the way, the operator or user may select only those parts of the operational environment information as required by the user for storage of the operational environment information in the removable on volatile storage device or medium 7. In that case, arrangement may be made such that the CPU 1 responds to a corresponding user's command inputted through the keyboard 100 to thereby issue a control signal to the display controller 111 for causing the latter to display the operational environment information on the display device 113 in the form of a menu so that only those pieces of operational environment information as pointed with the mouse 110 are saved. The program or software which is executed by the CPU 1 for performing the processing mentioned above may previously stored in a read-only memory (ROM).

On the other hand, the information processing apparatus 10 or 11 which resumes or reopens the suspended work responds to a command inputted through the keyboard 100 to thereby issue a control signal to the input/output controller 5 for reading or fetching the operational environment information from the removable nonvolatile storage device or medium 7 to thereby perform the processing for setting up the operational environment such as generation of the data display on the screen, setup of communication ports, writing setup information in various registers and others.

By way of example, when the display of data which constitutes one feature of the operational environment to be set up is performed, the data for the display as stored in the removable nonvolatile storage device or medium 7 as the operational environment information is read out under the control of the I/O controller 5 provided in association with the CPU 1 and stored once in the main memory 3.

Subsequently, the data is transferred from the main memory 3 to the display-dedicated memory 112 under the control of the display controller 111 to be thereby displayed on the display device 113. This processing may be executed by an application software prepared to this end.

As a modification of the embodiment of the invention described above, there may be conceived such arrangement that difference between the operational environment information corresponding to the operational environment set up in the information processing apparatus 9 shown in FIG. 3 and the operational environment information for the information processing apparatus 10 or 11 is extracted to be also handled as one part of the operational environment information for structuring or setting up the operational environment for the user. In that case, the operational environment information corresponding to the operational environment set up in the information processing apparatus 9 is stored in a storage medium. Further, the operational environment information corresponding to the operational environment set up in the information processing apparatus 10 or 11 is read out and compared with the operational environment information of the information processing apparatus 9 stored in the storage medium to thereby extract only the information which differs between the information processing apparatus 9 and the information processing apparatus 10 or 11. Subsequently, the operational environment for the information processing apparatus 10 or 11 corresponding to the difference information derived as the result of the comparison is additionally structured in the information processing apparatus 10 or 11. In that case, the information processing apparatus 10 or 11 may be implemented in such a structure which is equipped with a removable nonvolatile storage device for storing only the operational environment information specific to the information processing apparatus 10 or 11.

In this conjunction, by storing information indicating the newly added or modified portion of the operational environment information for the information processing apparatus 10 or 11 in a storage medium (e.g. the storage medium mounted by the user of the information processing apparatus 9), it becomes easily possible to reproduce the preceding operational environment for the information processing apparatus 10 or 11 after completion of the work performed by the user of the information processing apparatus 9.

Additionally, by adopting such arrangement that the user's operational environment information saved in the removable nonvolatile storage device or medium is stored straightforwardly in an empty or unoccupied area of a storage of the other information processing apparatus instead of rewriting the system file thereof for altering or modifying the operational environment for the other information processing apparatus, the operational environment thereof can be renewed without destroying the original operational environment for the other information processing apparatus. By way of example, assume that the user of the information processing apparatus 9 shown in FIG. 3 stores the operational environment information for the information processing apparatus 9 in the removable nonvolatile storage device or medium 7 and thereafter mounts the removable nonvolatile storage device or medium in the information processing apparatus 10 for setting up the desired operational environment. In that case, the operational environment information corresponding to the existing environment set up in the information processing apparatus 10 may be saved in a system file thereof without destroying the operational environment information.

Now, description will be directed to a procedure for saving the operational environment information and setting up the operational environment in the other information processing apparatus.

Figure 12:
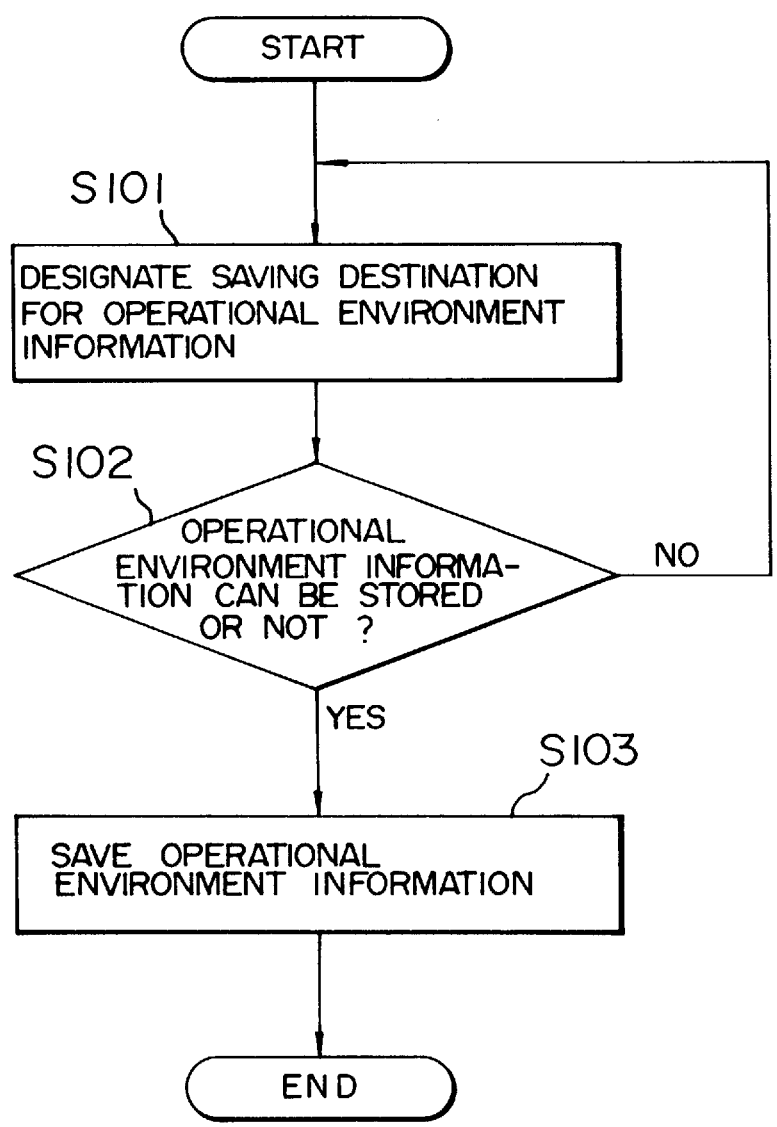
FIG. 12 is a flow chart for illustrating operation involved in the processing for saving operational environment information according to an embodiment of the invention.

FIG. 12 is a flow chart illustrating a procedure for saving the operational environment information. In accordance with applications installed beforehand in the I/O devices 8, the CPU 1 performs a series of processings in cooperation with other constituent elements.

As an initial work to be performed immediately after power-on of the information processing apparatus of concern, the CPU 1 thereof determines the system configuration of the information processing apparatus and decides inter alia whether the removable nonvolatile storage device or medium 7 (see FIG. 2) is mounted or not in accordance with a system configuration check application program. Further, the removable nonvolatile storage device and/or storage medium mounted after the power-on of the information processing apparatus are handled similarly to those mounted before the information processing apparatus is powered on.

Activation of the application program mentioned above can be effected by inputting a relevant command or actuating a specific key allocated to this end. After the saving operation is started in succession to activation of the aforementioned application, the removable nonvolatile storage devices and the storages medium as mounted are displayed on a display screen of the display device 113 preferably in the form of a menu. Thus, the user can designate the destination place where the operational environment information is to be saved (step S101). The designation can be realized by pointing with the mouse 110 the desired saving destination displayed in the menu. Of course, in place of or in combination with the menu display function for designation of the destination for the saving as mentioned above, such arrangement may equally be adopted in which specific destinations are allocated to specific keys of the keyboard in correspondence relation. In this case, the desired saving destination can be designated by pressing a corresponding key on the keyboard.

Subsequently, the CPU 1 operates the I/O controller 5 to check the remaining capacity of the saving destination storage as designated for saving the operational environment information to thereby decide whether or not the operational environment information can be stored therein (step S102). In this conjunction, it should be added that the operational environment information is sequentially stored in a predetermined region of the main memory by the CPU 1. Thus, the CPU 1 can know the volume of the operational environment information by checking the area occupied by the operational environment information in the predetermined region mentioned above.

When it is found impossible to save the operational environment information in the designated destination place (i.e., when the decision step S102 results in negation "NO", the processing branches to the step S101 for designating again the destination for saving the operational environment information (step S102).

On the other hand, when the saving destination place as designated is capable of saving the operational environment information (i.e., when the decision step S102 results in affirmation "YES"), the operational environment information is stored in the designated destination such as the storage medium, removable nonvolatile storage device or the like in a step S103, whereupon the operational environment information save processing comes to an end.

Finally, it is to be mentioned that such a step should preferably be provided in which various types of available operational environment information are displayed in a list in a menu-like form for selecting with the aid of the mouse 110 or the like only the operational environment information to be saved, whereon the destination for saving the selected operational environment information is designated.

Figure 13:
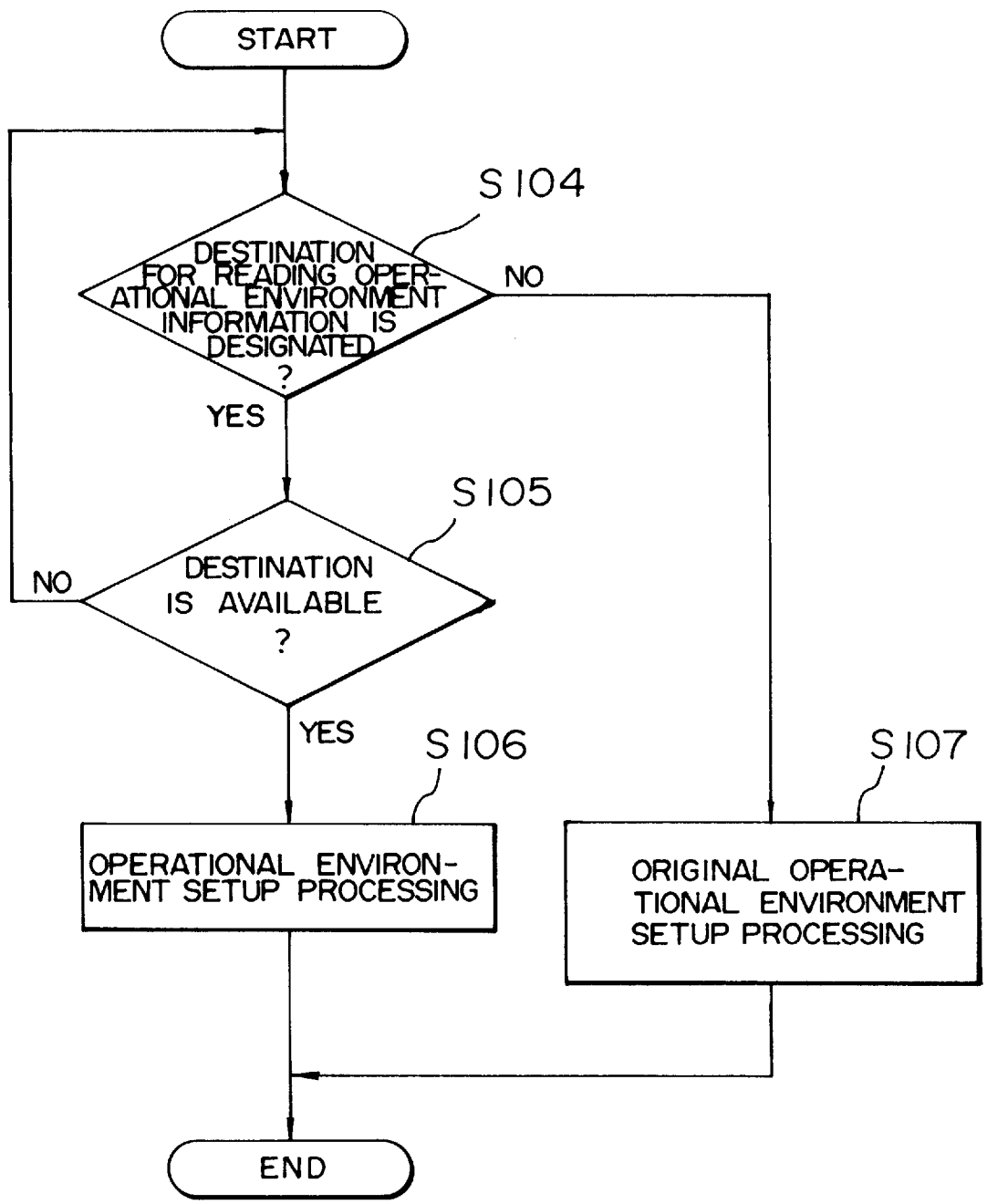
FIG. 13 is a flow chart for illustrating operations involved in a processing for setting up identical operational environment in other information processing apparatus by making use of operational environment information according to a further embodiment of the invention.

Next, referring to FIG. 13, description will be made of a procedure for reading out the operational environment information from the storage medium, the removable nonvolatile storage device or the like in which the operational environment information has been saved and structuring or setting up the operational environment corresponding to the operational environment information as read out in other information processing apparatus.

As in the case of the procedure for saving the operational environment information described above, a series of processings described below is executed by the CPU 1 in cooperation with other constituent elements. Activation of the application program mentioned previously is effectuated by depressing a specific key of the keyboard or by inputting a command specific to this end. Upon activation, the application program checks the structures of the individual I/O devices connected to the associated information processing apparatus and detects the types or species thereof.

After activation of the application program mentioned above, a mode for reading out the operational environment information and structuring or setting up the operational environment for the other information processing apparatus is realized. Of course, the removable nonvolatile storage device, the storage medium or the like storing the saved operational environment information is mounted on the information processing apparatus by the user. Thus, the state labeled "START" in FIG. 13 is realized.

Next, in a step S104, the user is requested to designate the storage from which the operational environment information is to be read out (i.e., either the storage medium, the removable nonvolatile storage device or other). More specifically, the system configuration detected by the application program as mentioned above is displayed on the display device 113 in the form of a menu so that any one of the storage facilities displayed therein can be selected with the aid of the mouse 110 or other means. Thus, the user can easily select the storage in which the operational environment information is saved. Parenthetically, in place of or in addition to the function for allowing the storage to be designated from the menu, such arrangement may equally be adopted that specific storages are assigned to specific keys of the keyboard in correspondence relation, respectively. In that case, the storage in which the operational environment information is saved (i.e., the destination storage from which the operational environment information is to be read out) can be designated through key manipulation.

At this juncture, it should be mentioned that in view of such possibility that the application program of the type mentioned above is not installed in the information processing apparatus of concern, the application program should preferably be handled as one of the operational environment information and stored in the removable nonvolatile storage device, the storage medium or other.

When operation for designating the destination storage storing the saved operational environment information is performed (i.e., when the answer of the decision step S104 is "YES"), then the processing proceeds to a step S105 where it is decided whether the designated destination storage is available (e.g. whether the storage device or medium is mounted or not).

On the other hand, unless the operation for designating the destination storage storing the saved operational environment information is performed (i.e, when the answer of the decision step S104 is "NO"), the processing branches to a step S107 and the operational environment set up originally for the information processing apparatus of concern is realized without making use of the operational environment information saved in the storage facility. This decision processing can be effected by displaying in a menu the connection states of the individual I/O devices as detected by the application program activated upon start of operation of the information processing apparatus.

When the decision step S105 results in affirmation "YES", a processing step S106 is executed for structuring the operational environment by making use of the operational environment information. More specifically, the CPU 1 supplies a control signal to the I/O controller 5 for reading out the operational environment information from the removable nonvolatile storage device or medium or other to store the information in a predetermined region of the removable nonvolatile storage device or medium. In succession, the CPU 1 structures the operational environment by referencing the operational environment information as fetched from the removable nonvolatile storage device or medium.

By way of example, when display of the data which is one part of the operational generate is to be generated, the application program reads out the data for display from the removable nonvolatile storage device or medium as the operational environment information via the I/O controller 5 and stores the information once in the main memory 3. Thereafter, under the control of the display controller 111, the data is transferred from the main memory 3 to the display-dedicated memory 112 to be displayed on the display device 113.

Upon completion of the processing step S106 or S107, the overall processing for reading out the operational environment information and structuring the operational environment corresponding to that information in the other information processing apparatus comes to an end.

It should finally be added that in view of the case where the operational environment originally set up for the information processing apparatus of concern is to be established or structured without using the operational environment information saved in a storage such as the removable nonvolatile storage device or medium, the processing may be arranged such that when a specific key of the keyboard 100 is actuated, the processing branches to the step S107 in the interrupt state.

What is claimed is:

1. An information processing apparatus capable of detachable mounting thereon a removable nonvolatile storage means, comprising:

store command means for commanding storage of operational environment information used for setting up operational environment in said removable nonvolatile storage means mounted in said information processing apparatus;

operational environment setup command means responsive to mounting of the removable nonvolatile storage means storing said operational environment information in said information processing apparatus for thereby commanding set up of the operational environment by referencing contents of said removable nonvolatile storage means as mounted; and processing means for performing operation required for setting up the operational environment, wherein said processing means performs:

processing for storing the operational environment information in the removable nonvolatile storage means as mounted in response to said command of said store command means;

processing for referencing the operational environment information stored in said nonvolatile storage means as mounted in response to a command of said operational environment setup command means to set up the operational environment indicated by the operational environment information as referenced; and processing for saving information concerning a state of the information processing apparatus at a suspension time.

2. An information processing apparatus according to claim 1, further comprising:

selecting means for selecting one of a plurality of said operational environment information; and selective store command means for commanding storage of said selected part of information in the removable nonvolatile storage means mounted on said information processing apparatus, wherein said processing means responds to the command of said selective store command means for storing said part of information selected by said selecting means in said nonvolatile storage means mounted on said information processing apparatus.

3. An information processing apparatus according to claim 2, wherein said operational environment information contains at least data generated by using said information processing apparatus, application loaded into said information processing apparatus, data for display, information stored in a register and interrupt information supplied externally of said information processing apparatus.

4. An information processing apparatus, comprising:

a processor;

a main memory;

a bus connected to said processor and said main memory;

a storage unit capable of being connected to the bus;

wherein said processor detects whether or not saved past suspensive information concerning a past state of said apparatus in response to a suspension and including resume information is in said main memory, saves present suspensive information concerning a present state of said apparatus including resume information and application software data at a suspension time in said main memory when said saved past suspensive information is not in said main memory, transmits said saved data to said storage unit when saved data is in said main memory before saving suspensive time information concerning a state of said apparatus and including application software data in said main memory at the suspension time.

5. An information processing apparatus according to claim 4, wherein said storage unit is nonvolatile and capable of removably being mounted on said information processing apparatus.

6. An information processing apparatus according to claim 5, wherein said processing means is operable when said storage unit is removed from said information processing apparatus.

7. An information processing apparatus according to claim 4, wherein said suspensive information contains at least setting data of I/O port of said storage unit.

* * * * *